United States Patent
Boquillon et al.

(10) Patent No.: US 11,428,016 B2
(45) Date of Patent: Aug. 30, 2022

(54) FLOOR OR WALL COVERING PANEL WITH RIGID COMPOSITE CORE LAYER

(71) Applicant: TARKETT GDL, Lentzweiler (LU)

(72) Inventors: Nicolas Boquillon, Wiltz (LU); Mathieu Coquelle, Wiltz (LU); Jonas Bladh, Wiltz (LU); Diego Gourdin, Wiltz (LU)

(73) Assignee: TARKETT GDL, Lentzweiler (LU)

( * ) Notice: Subject to any disclaimer, the term of this patent is extended or adjusted under 35 U.S.C. 154(b) by 0 days.

(21) Appl. No.: 17/046,812

(22) PCT Filed: Apr. 9, 2019

(86) PCT No.: PCT/EP2019/058930
§ 371 (c)(1),
(2) Date: Oct. 12, 2020

(87) PCT Pub. No.: WO2019/197393
PCT Pub. Date: Oct. 17, 2019

(65) Prior Publication Data
US 2021/0148121 A1 May 20, 2021

(30) Foreign Application Priority Data

Apr. 10, 2018 (LU) ........................................ 100764

(51) Int. Cl.
*E04C 1/00* (2006.01)
*E04F 15/10* (2006.01)
(Continued)

(52) U.S. Cl.
CPC .............. *E04F 15/107* (2013.01); *B32B 3/06* (2013.01); *B32B 7/022* (2019.01); *B32B 27/08* (2013.01);
(Continued)

(58) Field of Classification Search
CPC .......... E04F 15/02033; E04F 15/02038; E04F 15/107; E04F 15/102; E04F 2201/042;
(Continued)

(56) References Cited

U.S. PATENT DOCUMENTS 7,763,345 B2   7/2010  Chen
8,549,807 B2 * 10/2013  Meersseman ............. B32B 7/12
                                                          52/313
(Continued)

FOREIGN PATENT DOCUMENTS

DE   202017100592 U1   6/2017
WO      2015152802 A1  10/2015
(Continued)

OTHER PUBLICATIONS

International Search Report for corresponding application PCT/EP2019/058930 filed Apr. 9, 2019; dated Jun. 27, 2019.
(Continued)

*Primary Examiner* — Chi Q Nguyen
(74) *Attorney, Agent, or Firm* — Cantor Colburn LLP (57) ABSTRACT

A floor or wall covering panel has a top and a bottom surface, and at least four sides, where a first and a second side include a first and a second connection profile, respectively, the first profile being configured for mechanically engaging and interlocking with the second profile of another panel, the first profile including a tongue protruding beyond the top edge of the first side, where the second profile includes a groove recessed with respect to the top edge of the second side, the groove is delimited at its bottom by a base, the panel is of laminar structure including a rigid core layer and a wear layer arranged on the core layer, where the core layer includes a first and a second sublayer of a first and a second composite material, respectively, the second sublayer being arranged atop the first sublayer, where both (Continued)

composite materials comprise thermoplastic material and filler material but are of different formulations, and the base delimiting the groove bottom is realized essentially within the first core sublayer.

23 Claims, 3 Drawing Sheets (51) Int. Cl.
| | |
|---|---|
| B32B 7/022 | (2019.01) |
| B32B 3/06 | (2006.01) |
| B32B 27/08 | (2006.01) |
| B32B 27/20 | (2006.01) |
| B32B 27/22 | (2006.01) |
| B32B 27/30 | (2006.01) |
| E04F 13/08 | (2006.01) |
| E04F 13/16 | (2006.01) |
| E04F 15/02 | (2006.01) |

(52) U.S. Cl.
CPC ............ *B32B 27/20* (2013.01); *B32B 27/22* (2013.01); *B32B 27/304* (2013.01); *E04F 13/0866* (2013.01); *E04F 13/0894* (2013.01); *E04F 13/165* (2013.01); *E04F 15/02038* (2013.01); *E04F 15/105* (2013.01); *B32B 2250/04* (2013.01); *B32B 2250/24* (2013.01); *B32B 2264/104* (2013.01); *B32B 2307/546* (2013.01); *B32B 2419/04* (2013.01); *B32B 2607/02* (2013.01); *E04F 2201/043* (2013.01)

(58) Field of Classification Search
CPC .......... E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138
USPC .. 52/592.1, 592.3, 592.2, 578, 588.1, 309.1, 52/309.3
See application file for complete search history.

(56) References Cited

U.S. PATENT DOCUMENTS

| | | | | |
|---|---|---|---|---|
| 8,833,028 | B2* | 9/2014 | Whispell | B32B 3/06 52/588.1 |
| 8,925,275 | B2* | 1/2015 | Meersseman | B32B 27/304 52/588.1 |
| 11,186,117 | B2* | 11/2021 | Hannig | B32B 5/145 |
| 2014/0109507 | A1* | 4/2014 | Dossche | B32B 9/002 52/588.1 |
| 2016/0083965 | A1* | 3/2016 | Baert | E04F 13/18 52/309.15 |
| 2016/0153190 | A1* | 6/2016 | Doehring | B44C 1/00 428/192 |
| 2016/0369507 | A1* | 12/2016 | Pervan | B32B 13/06 |
| 2018/0127987 | A1* | 5/2018 | Bradway | D06N 7/0076 |
| 2019/0017278 | A1* | 1/2019 | De Rick | E04F 15/105 |
| 2019/0383030 | A1* | 12/2019 | Lombaert | B32B 7/12 |
| 2020/0308846 | A1* | 10/2020 | Josefsson | E04F 13/0894 |
| 2020/0325689 | A1* | 10/2020 | Li | B32B 27/36 |

FOREIGN PATENT DOCUMENTS

| | | |
|---|---|---|
| WO | 2017027155 A1 | 2/2017 |
| WO | 2017133804 A1 | 8/2017 |
| WO | 2018058766 A1 | 4/2018 |
| WO | 2018073645 A2 | 4/2018 |

OTHER PUBLICATIONS

Written Opinion of the International Searching Authority for corresponding application PCT/EP2019/058930 filed Apr. 9, 2019; dated Jun. 27, 2019.

* cited by examiner

FLOOR OR WALL COVERING PANEL WITH RIGID COMPOSITE CORE LAYER

FIELD OF THE INVENTION

The invention generally relates to a floor or wall covering panel, comprising a rigid composite core layer. The invention also relates to a process for producing a panel according to the invention. The invention further relates to a panel obtainable by the process.

BACKGROUND OF THE INVENTION

Floor or wall covering panels are widely known as such. Prior art embodiments of floor or wall covering planks have been disclosed, for instance, in U.S. Pat. No. 7,763,345. These planks, suffer in practice from allowing an uneven upper surface caused by irregularities of the underlying substrate on which the panels are applied.

This problem was recognized in WO 2017/133804, which proposed develop a panel that is more rigid so that a visible unevenness does no longer occur in practice, while meeting a general requirement that the panel does not suffer from excessive shrinking and expansion due to seasonal and/or local temperature changes. WO 2017/133804 further proposes to simplify the laminate structure by reducing the number of layers, especially avoiding the use of a reinforcement layer and/or an adhesive layer to fix two layers to each other.

The present invention addresses a different problem, which is observed in rigid, polymer-based floor or wall covering panels having mechanical connection profiles allowing them to be connected to each other. Due to the high stiffness of the panels, the mechanical connection profiles represent weak points of the floor covering once it is assembled, because each connection profile has reduced thickness compared to the rest of the panel. Accordingly, when transmission of forces from the top surface of the floor covering to the subfloor is impeded, e.g. because of slight subfloor unevenness and/or slight dimensional deviations of the connection profiles from the nominal values, high local stresses may occur within the material, which may lead to breakage where the panels are the weakest, i.e. at the connection profiles.

Possible solutions to that problem have been devised in the context of the present invention.

SUMMARY OF THE INVENTION

In a first aspect, the present invention relates to a floor or wall covering panel, having a top surface, a bottom surface and at least four sides, wherein a first one of the sides comprises a first connection profile and a second one of the sides comprises a second connection profile, the first and second connection profiles being arranged on opposed sides of the panel, the first connection profile being configured for mechanically engaging and interlocking with a second connection profile of another floor or wall covering panel of the same type. The first side and the top surface meet at a top edge of the first side and the second side and the top surface meet at a top edge of the second side. The first connection profile comprises a tongue protruding beyond the top edge of the first side, whereas the second connection profile comprises a groove recessed with respect to the top edge of the second side. The groove is complementarily shaped to the tongue, so as to enable a tongue-and-groove connection between neighboring panels. The groove is delimited at its bottom by a base, protruding or not beyond the top edge of the second side. The floor or wall covering panel is of a laminar (layered) structure, including a rigid core layer and a wear layer arranged on the core layer. The core layer includes a first sublayer of a first composite material and a second sublayer of a second composite material atop the first sublayer. Each of the first and second composite materials comprises thermoplastic material and filler material but are of different formulations. The base delimiting the bottom of the groove is realized essentially (e.g. to at least to 80% of its weight or to at least to 90% of its weight or entirely) within the first sublayer of the core layer.

As used herein, the term "sublayer" designates a layer constituting an integral part of the core layer. The term core layer designates the layer (or assembly of sublayers) that serves as the structural support layer of the panel. Besides the first and second sublayers, the core may have further sublayers.

All indications of orientation and (relative) position used herein, such as, e.g., "top", "bottom", "above", "below", "atop", etc., refer to orientation and (relative) position as when the panel is posed flat on the floor, the decorative face turned upwards. This convention is used also if the panel is a wall covering panel. Furthermore, this convention is not intended to imply that the inventive panel is claimed only in that position and with that orientation.

Further, the term "rigid" is herein used as a qualifier of floor or wall covering panels, or layers thereof, which are significantly more rigid than classical resilient flooring materials. Specifically, as used herein, "rigid" is meant herein to imply a relatively high modulus of elasticity (measured according to EN 310), e.g. greater than 1000 Mpa, preferably greater than 2000 MPa, more preferably greater than 4000 MPa. The MOE of the core layer (or its sublayers) is preferably situated in the range from 1000 MPa to 15000 MPa. Compared to a resilient panels, rigid panels facilitate installation and better bridge slight unevenness as well as local bumps or recesses of the installation surface in a permanent manner (over the lifetime of the surface covering).

The different formulations of the composite materials result in different physical properties of the first and second sublayers. In particular, the formulations may be selected in such a way that the first (lower) sublayer has a lower stiffness than the second sublayer. Accordingly, the first sublayer may bend or otherwise yield more easily under load, reducing the base's susceptibility to breaking. Although the first sublayer having a lower stiffness than the second sublayer is presently regarded preferable, the opposite configuration, i.e. the second sublayer having a lower stiffness than the first sublayer, may turn out to be more advantageous for specific geometric configurations of the connection profiles.

High stiffness of the core sublayers is preferably achieved by incorporating relatively large amounts of mineral filler material and/or by incorporating no or only small amounts of plasticizers into the thermoplastic material of the composite core layer. A further advantage of the panels according to the invention is their waterproofness, making them suitable for both indoor and outdoor uses.

The thermoplastic material of the first and second composite materials could comprise, e.g., PE (polyethylene, including LDPE, HDPE etc.), PU (polyurethane), ABS (acrylonitrile butadiene styrene), PP (polypropylene) or PVC (polyvinyl chloride) resin. Further possible choices of the thermoplastic materials include, without being limited to, polyvinyl acetate (PVA), polyvinyl alcohol (PVOH), other vinyl and vinylidene resins and copolymers, polystyrene (PS), styrene copolymers, propylene copolymers, polyesters; acrylics; polyamide, polycarbonate (PC), polyimide, polysulfone, etc. The thermoplastic material can be virgin, recycled, or a mixture of both. Of all the cited thermoplastics, PVC is currently a preferred choice. Preferably, the thermoplastic material comprises 70% by weight or more of PVC resin.

Preferably, thermoplastic material of the first composite material comprises from 2.5% to 20% by weight of plasticizer with respect to the PVC resin.

The thermoplastic material of the second composite material preferably comprises no or less than 2.5% by weight of plasticizer with respect to the PVC resin.

According to an embodiment, the thermoplastic material of the first composite material comprises from 2.5% to 20% by weight of plasticizer with respect to the PVC resin, the thermoplastic material of the second composite material comprises no or less than 2.5% by weight of plasticizer with respect to the PVC resin, and the ratio of the plasticizer content of the thermoplastic material of the first composite material to the plasticizer content of the thermoplastic material of the second composite material is comprised in the range from 5 to 100. It should be noted that although the formulations of the first and second composite materials are different, both composite materials are substantially stiffer than classical resilient flooring materials. Accordingly, each sublayer qualifies as a rigid layer.

Low amounts of plasticizer result in higher rigidity of the core layer. Plasticizers that could be used include: organic esters of various acids such as phthalic, phosphoric, adipic, sebacic, citric, acid. Specific examples of plasticizers include dioctyl phthalate, dioctyl adipate, dibutyl sebacate, and dinonyl phthalate and glyceryl stearate. Alternative plasticizers include so-called "bioplasticizers", e.g. plasticizers derived from vegetable oils, such as soybean oil, canola oil, corn oil, linseed oil, rapeseed oil, safflower oil, sunflower oil, tall oil, tung oil, etc.

Preferably, the first and second sublayers are coextruded composite layers. More preferably, the entire core layer is obtained by a coextrusion process.

The thickness of the first sublayer preferably amounts to 40% or less of the thickness of the core layer. The thickness of the first sublayer preferably amounts to between 10% and 40%, more preferably to between 10% and 33%, of the thickness of the entire core layer.

Preferably, the filler material of the first and second composite materials consists of at least 70% by weight of mineral material, e.g. of calcium carbonate, magnesium oxide, chalk, clay, calcium silicate, talc, silicates, aluminates or a mixture thereof. More preferably, the filler material is comprised of mineral material only. The filler material is preferably in the form of particulate mineral filler.

The composite materials of the core sublayers could comprise natural organic fibres as (part of) the filler material, e.g., cellulose fibres, wood fibre, bamboo fibres, hemp fibres, etc. Alternatively, the composite materials of the core sublayers could be free of natural organic fibres, in particular free of wood fibre.

Preferably, the first and second composite materials of the core sublayers comprises at least 40% by weight, more preferably at least 50% by weight, even more preferably at least 60% by weight of mineral filler. Preferably, the filler content of the core sublayers does not exceed the value of 85% by weight. More preferably, the filler content of the core sublayers does not exceed the value of 75% by weight.

The floor or wall covering panel preferably has an overall height comprised in the range from 2.5 to 10 mm, more preferably in the range from 3 mm to 6 mm, and most preferably in the range from 3 mm to 4.5 mm.

According to a preferred embodiment, the first and second connection profiles are machined (e.g. cut milled or drilled) into the first and second sides, respectively.

The composite materials may comprises one or more additives, such as pigments, impact modifiers, lubricants, stabilizers, waxes and/or processing aids. Pigments, if present, may be of any desired color. Impact modifiers could include, for instance, MBS (Methacrylate-Butadiene-Styrene), CPVC (chlorinated PVC), ABS (acrylonitrile butadiene styrene) or TPE (thermoplastic elastomer). Lubricants could include internal lubricant(s) and external lubricant(s). Preferred internal lubricants include metallic stearates, such as, e.g. calcium and zinc salts of stearic acid. External lubricants, could include, for instance, low-melting paraffins. The stabilizer could, for instance, comprise a calcium zinc stabilizer. Preferably, a calcium zinc stabilizer having a zinc content of 5.5% to 11% by weight or more could be used. Other examples of possible stabilizers include, without being limited to, barium-cadmium stabilizer, barium-zinc stabilizer, epoxidized soybean oil, etc. Preferably, the total amount of additives present in the composite materials of the core sublayers does not exceed 15% by weight. More preferably additive content is less than 12% by weight.

The floor or wall covering panel comprises a wear layer on top of the core layer. The wear layer could comprise a melamine-adhesive-impregnated transparent paper layer or a PVC layer with low plasticizer content (preferably less than 5% by weight with respect to the PVC content), optionally with corundum particles dispersed therein, for improved wear resistance. The wear layer and the core layer may sandwich a décor layer (e.g. a printed décor layer). The wear layer could comprise a varnish (e.g. a PU varnish) on its top surface.

A preferred process for the fabrication of a floor or wall covering panel includes:
 preparing the composite materials of the first and second sublayers in by mixing of the respective components according to the different formulations;
 co-extruding molten core sublayers of the composite materials using an extruder with a co-extrusion die;
 leading the co-extruded core sublayers over rollers so as to obtain a core layer;
 laminating a wear layer on the core layer top layer
 cutting the core layer into panels and machining the connection profiles into the sides of the panels.

Instead of a co-extruding the core layer, one could extrude the sublayers of the core separately and laminate them together (using fusion and/or adhesive) in one or more further steps. However, the machining of the connection profiles is carried out after the core layer has been assembled. The wear layer could be applied on the core layer before or after the panels are cut and before or after the machining of the connection profiles.

BRIEF DESCRIPTION OF THE DRAWINGS

By way of example, preferred, non-limiting embodiments of the invention will now be described in detail with reference to the accompanying drawings, in which.

DETAILED DESCRIPTION OF PREFERRED EMBODIMENTS OF THE INVENTION

Figure 1:
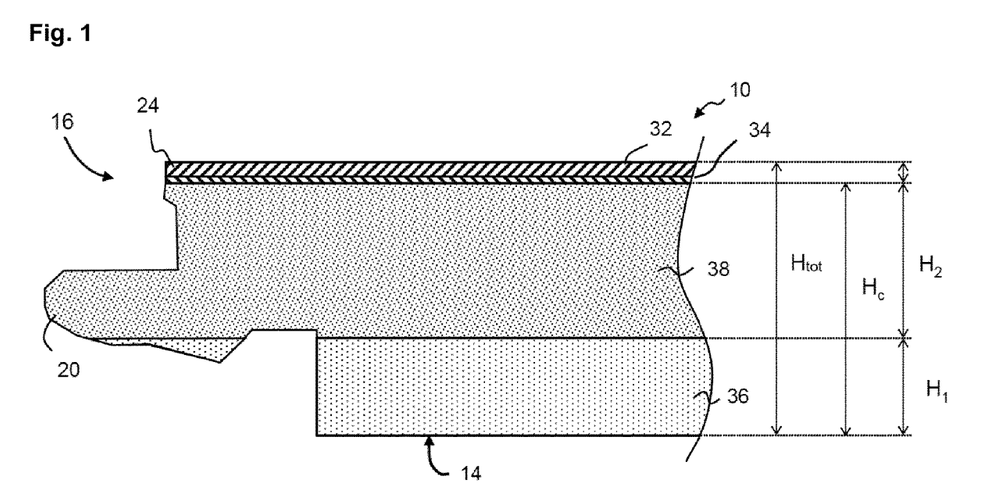
FIG. 1: is a schematic cross-sectional view of a first connection profile of a flooring panel according to a preferred embodiment of the invention.
Figure 2:
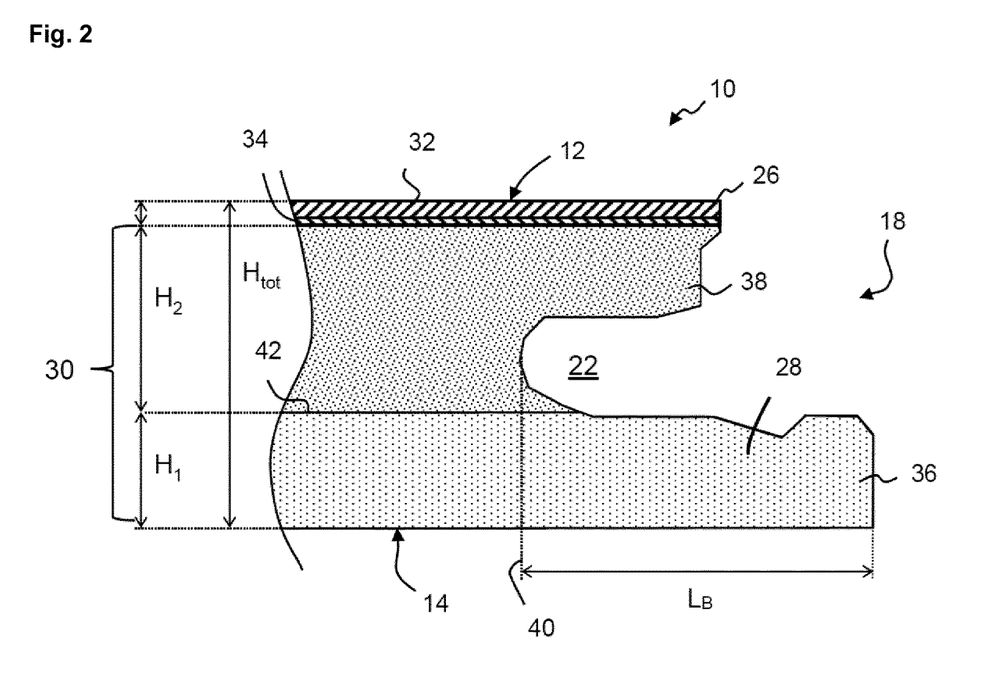
FIG. 2: is a schematic cross-sectional view of a second connection profile of the flooring panel, complementary to the connection profile of FIG. 1.

FIGS. 1 and 2 show a flooring panel 10 according to a first preferred embodiment of the invention. The flooring panel 10 has a having a top surface 12, a bottom surface 14 and at least four sides. FIG. 1 shows a first one of the sides in more detail, while FIG. shows the complementarily shaped opposite side 18 (called herein "the second side"). The first side 16 comprises a first connection profile featuring a tongue 20 and the second side 18 comprises a second connection profile featuring a groove 22. The first and second connection profiles are configured for mechanically engaging and interlocking with a second and a first connection profile, respectively, of another flooring panel of the same type.

The edge 26 where the first side 16 and the top surface 12 meet is hereinafter called the first top edge and the edge 26 where the second side 18 and the top surface 12 meet is hereinafter called the second top edge. When two flooring panels are connected at their first and second connection profile, respectively, the corresponding first and second top edges come to lie adjacent each other.

The tongue of the first connection profile protrudes beyond (as "seen" from the panel 10) the first top edge 24, whereas the groove 22 of the second connection profile is recessed with respect to the second top edge 26. The tongue 20 and groove 22 are complementarily shaped, so as to enable a tongue-and-groove connection between neighboring panels. The groove 22 is delimited at its bottom by a base 28. In the illustrated embodiment, the base 28 protrudes beyond (as "seen" from the panel 10) the second top edge 26, but whether the extremity of the base 28 protrudes or is recessed with respect to the second top edge depends on the geometrical configuration of the first and second connection profiles.

The flooring panel 10 is of a layered structure and includes a rigid core layer 30 and a wear layer 32 arranged on the core layer. In the illustrated embodiment, the core layer 30 and the wear layer 32 sandwich a decorative layer 34 (e.g. a print layer). The wear layer 32 is in this case transparent or translucent, so that the décor is apparent to the users. The decorative layer 34 could comprise a dedicated printing substrate carrying one or more ink layers. Alternatively, the decorative layer could consist of ink layer(s) printed directly on the backside of the wear layer 32 or the top side of the core layer 30.

The core layer 30 comprises a first sublayer 36 of a first composite material and a second sublayer 38 of a second composite material atop the first sublayer 36. The first and second composite materials comprise thermoplastic material, in particular PVC resin, and filler material but are of different formulations, which give them different mechanical properties, in particular different stiffness.

The base 28 delimiting the bottom of the groove 22 is realized essentially (e.g. to at least to 80% of its weight or to at least to 90% of its weight or entirely) within the first sublayer 36 of the core layer 30. The weight of the base 28 herein means the weight of the part of the core layer 30 that extends below the groove 22 between the inner extremity of the groove 22 and the outer extremity of the base 28 (i.e. over length $L_B$ in FIG. 2). The weight of the base 28 can thus be determined experimentally by cutting the base 28 along the line 40 and weighting the part thus obtained. The proportion of the base 28 realized in the first sublayer 36 can then be determined by cutting the base 28 at the interface 42 between the first and second sublayers 36, 38 and weighting the fragments belonging to the first or second sublayer.

In the illustrated embodiment, the formulations of the first and second sublayers are selected in such a way that the first (lower) sublayer 36 has a lower stiffness than the second sublayer 38. Accordingly, the first sublayer 36 bends or otherwise yields more easily under load, reducing the susceptibility of base 28 to breaking. Experiments showed that flooring made of rigid synthetic floor panels (not glued to the underfloor) according to this embodiment exhibited less breakage in so-called castor-chair tests than floor panels having a core layer consisting entirely of the stiffer material.

The thickness $H_1$ of the first sublayer 36 amounts to a value within the range from 10% to 40% of the thickness $H_C$ of the core layer 30. More preferably, the value of $H_1$ is situated in the range from 15% to 33% of $H_C$. It should be noted that the drawings are not to scale.

The flooring panel 10 has an overall height $H_{tot}$ in the range from 2.5 to 10 mm, preferably in the range from 3 mm to 6 mm, and most preferably in the range from 3 mm to 4.5 mm. The invention is particularly interesting for thin rigid flooring panels having a height of 5 mm or less, e.g. 4.5 mm or less, or 4 mm or less, or 3.5 mm or less, or 3.2 mm or less.

Figure 3:
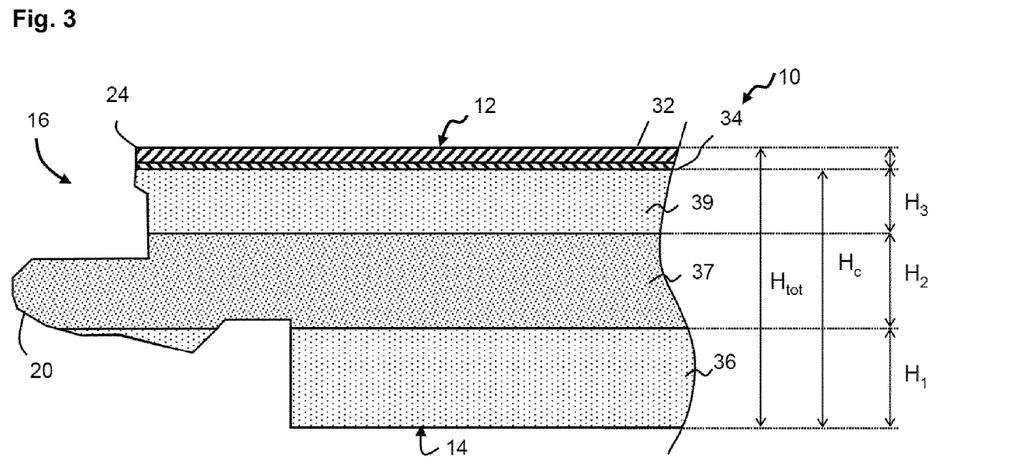
FIG. 3: is a schematic cross-sectional view of the first connection profile according to a variant of the flooring panel of FIG. 1.
Figure 4:
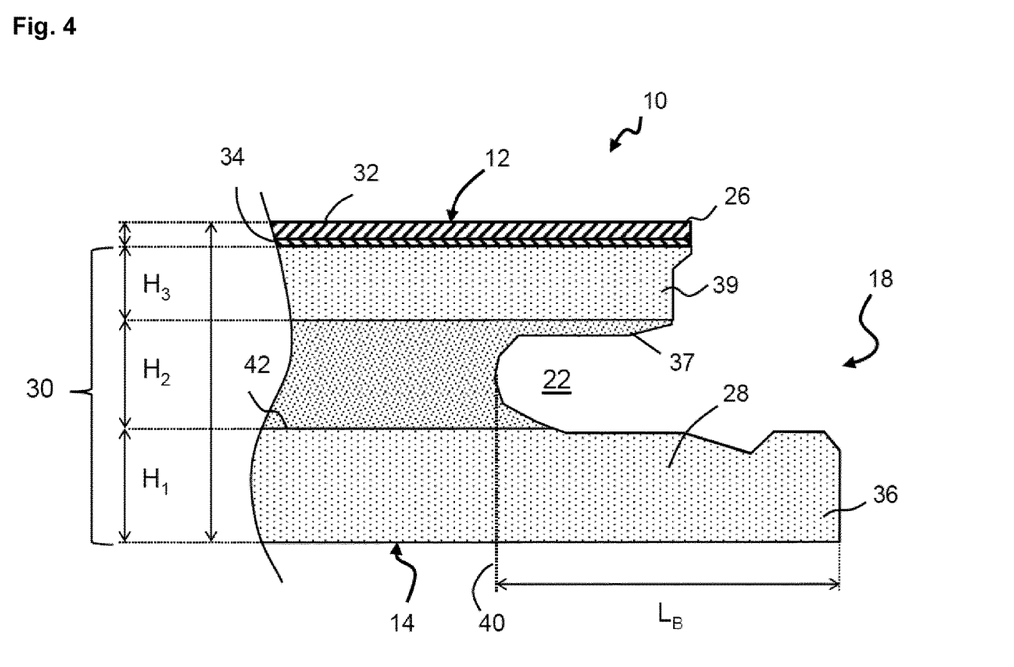
FIG. 4: is a schematic cross-sectional view of the second connection profile according to the variant of the flooring panel of FIG. 1.

FIGS. 3 and 4 show a flooring panel 10 according to a second preferred embodiment of the invention. With respect to the embodiment of FIGS. 1 and 2, the difference is that the core layer 30 comprises three sublayers 36, 37, 39 instead of two. Apart from that, the flooring panel of FIGS. 3 and 4 is substantially identical to the one of FIGS. 1 and 2. For the sake of brevity, only the differences will be discussed hereinafter. The reader may refer to the description of FIGS. 1 and 2 for explanations regarding the other aspects of the flooring panel.

The core layer 30 comprises a first sublayer 36 of a first composite material, a second sublayer 37 of a second composite material atop the first sublayer 36 and a third sublayer 39 of the first composite material atop the second sublayer 37. The first and second composite materials comprise thermoplastic material, in particular PVC resin, and filler material but are of different formulations, which give them different mechanical properties, in particular different stiffness.

Figure 5:
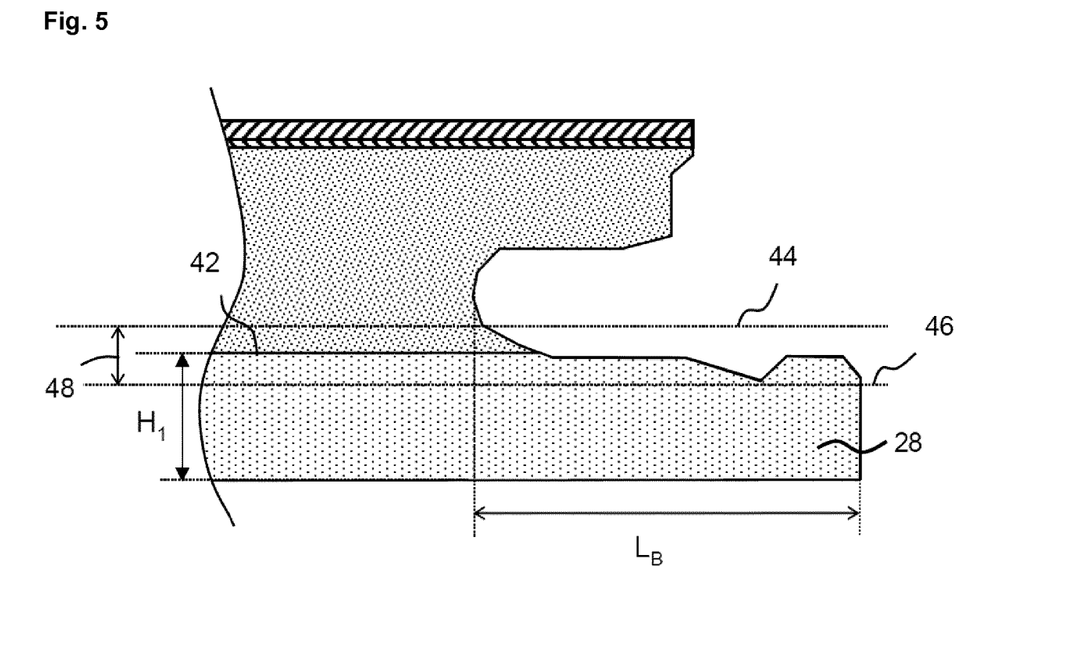
FIG. 5: is an illustration of how much the height of the first core sublayer can be varied according to a preferred aspect of the invention.

FIG. 5 illustrates that the height of the first sublayer can be varied. The thickness $H_1$ of the first sublayer amounts to at most 40% of the core layer thickness $H_C$. At the same time, a substantial part of the base 28 delimiting the bottom of the groove 22 is realized essentially within the first sublayer 36 of the core layer 30. Therefore, as illustrated in FIG. 5, the height $H_1$ may be varied between an upper bound 44 (corresponding to $0.4 \times H_C$) and a lower bound 46 (corresponding to the height below which less than 80% of the weight of the base consists of the material of the first sublayer). The interface 42 between the first and second sublayers therefore lies within a corridor 48 delimited by bounds 44 and 46.

Examples of flooring panels in accordance with preferred embodiments of the invention are indicated in the tables below.

TABLE 1

| Layer | Formulation | Amount (wt % w.r.t. layer) | Height |
|---|---|---|---|
| Wear layer | PVC | 90 | 0.2 mm |
|  | plasticizer | 5 |  |
|  | additives | 5 |  |
| Décor layer | Compatible inks printed on backside of wear layer | 100 | <20 μm |
| Upper core sublayer | PVC | 45 | 2 mm |
|  | plasticizer | 9 |  |
|  | Filler (CaCO₃) | 42 |  |
|  | Additive (processing aid) | 4 |  |
| Lower core sublayer | PVC | 54 | 1.9 mm |
|  | plasticizer | 0.5 |  |
|  | Filler (CaCO₃) | 40.5 |  |
|  | Additive (processing aid) | 5 |  |

TABLE 2

| Layer | Formulation | Amount (wt % w.r.t. layer) | Height |
|---|---|---|---|
| Wear layer | PVC | 95 | 0.2 mm |
|  | additives | 5 |  |
| Upper core sublayer | PVC | 46 | 1.8 mm |
|  | plasticizer | 3 |  |
|  | Filler (CaCO₃) | 45 |  |
|  | Additive (processing aid) | 6 |  |
| Lower core sublayer | PVC | 55 | 1.7 mm |
|  | Filler (CaCO₃) | 40 |  |
|  | Additive (processing aid) | 5 |  |

TABLE 3

| Layer | Formulation | Amount (wt % w.r.t. layer) | Height |
|---|---|---|---|
| Wear layer | PVC | 92 | 0.2 mm |
|  | Corundum particles | 3 |  |
|  | additives | 5 |  |
| Décor layer | Printing substrate carrying compatible inks | 100 | Approx.: 100 μm |
| Upper core sublayer | PVC | 40 | 1.8 mm |
|  | plasticizer | 5 |  |
|  | Filler (CaCO₃) | 48 |  |
|  | Additive (processing aid) | 7 |  |
| Lower core sublayer | PVC | 43 | 1.7 mm |
|  | plasticizer | 1 |  |
|  | Filler (CaCO₃) | 50 |  |
|  | Additive (processing aid) | 6 |  |

TABLE 4

| Layer | Formulation | Amount (wt % w.r.t. layer) | Height |
|---|---|---|---|
| Wear layer | PVC | 92 | 0.2 mm |
|  | Corundum particles | 3 |  |
|  | additives | 5 |  |
| Décor layer | Printing substrate carrying compatible inks | 100 | Approx.: 100 μm |
| Upper core sublayer | PVC | 42 | 0.9 mm |
|  | plasticizer | 0.5 |  |
|  | Filler (CaCO₃) | 52 |  |
|  | Additive (processing aid) | 5.5 |  |
| Middle core sublayer | PVC | 40.5 | 1.2 mm |
|  | plasticizer | 4.5 |  |
|  | Filler (CaCO₃) | 49 |  |
|  | Additive (processing aid) | 6 |  |
| Lower core sublayer | PVC | 42 | 0.9 mm |
|  | plasticizer | 0.5 |  |
|  | Filler (CaCO₃) | 52 |  |
|  | Additive (processing aid) | 5.5 |  |

While specific embodiments and examples have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A floor or wall covering panel, comprising:
a top surface,
a bottom surface and
at least four sides,
wherein a first one of the sides comprises a first connection profile and a second one of the sides comprises a second connection profile, the first and second connection profiles being arranged on opposed sides of the panel, the first connection profile being configured for mechanically engaging and interlocking with a second connection profile of another floor or wall covering panel,
wherein the first side and the top surface meet at a top edge of the first side and the second side and the top surface meet at a top edge of the second side,
wherein the first connection profile comprises a tongue protruding beyond the top edge of the first side,
wherein the second connection profile of the floor or wall covering panel comprises a groove recessed with respect to the top edge of the second side, the groove being delimited at a bottom of the groove by a base, protruding or not beyond the top edge of the second side;
wherein the floor or wall covering panel is of a laminar structure, including a rigid core layer having a modulus of elasticity, measured according to EN 310, greater than 1000 MPa, and a wear layer arranged on the core layer;
wherein the core layer includes a first sublayer of a first composite material and a second sublayer of a second composite material atop the first sublayer;
wherein each of the first and second composite materials comprises thermoplastic material and filler material, the first and second composite materials being of different formulations, the filler material of the first and second composite materials consisting of at least 70% by weight of mineral material;
wherein the base delimiting the bottom of the groove is realized at least to 80% of a weight of the base within the first sublayer of the core layer.

2. The floor or wall covering panel as claimed in claim 1, wherein the first composite material has lower stiffness than the second composite material.

3. The floor or wall covering panel as claimed in claim 1, wherein the thermoplastic material of the first and second composite materials comprises PVC resin.

4. The floor or wall covering panel as claimed in claim 3, wherein the thermoplastic material of the first composite material comprises from 2.5% to 20% by weight of plasticizer with respect to the PVC resin.

5. The floor or wall covering panel as claimed in claim 3, wherein the thermoplastic material of the second composite material comprises no or less than 2.5% by weight of plasticizer with respect to the PVC resin.

6. The floor or wall covering panel as claimed in claim 1, wherein the thermoplastic material of the first composite material comprises from 2.5% to 20% by weight of plasticizer with respect to the PVC resin, wherein the thermoplastic material of the second composite material comprises no or less than 2.5% by weight of plasticizer with respect to the PVC resin, and wherein the ratio of the plasticizer content of the thermoplastic material of the first composite material to the plasticizer content of the thermoplastic material of the second composite material is comprised in the range from 5 to 100.

7. The floor or wall covering panel as claimed in claim 1, wherein the first and second sublayers are coextruded composite layers.

8. The floor or wall covering panel as claimed in claim 1, wherein the first and second sublayers are extruded separately and then laminated together.

9. The floor or wall covering panel as claimed in claim 1, wherein the thickness of the first sublayer amounts to between 10% and 40% of the thickness of the entire core layer.

10. The floor or wall covering panel as claimed in claim 9, wherein the thickness of the first sublayer amounts to between 10% and 33% of the thickness of the entire core layer.

11. The floor or wall covering panel as claimed in claim 1, wherein the mineral material is calcium carbonate.

12. The floor or wall covering panel as claimed in claim 1, the floor or wall covering having an overall height comprised in the range from 2.5 to 10 mm.

13. The floor or wall covering panel as claimed in claim 12, the floor or wall covering having an overall height comprised in the range from 3 mm to 6 mm.

14. The floor or wall covering panel as claimed in claim 13, the floor or wall covering having an overall height comprised in the range from 3 mm to 4.5 mm.

15. A flooring panel, comprising:
a top surface,
a bottom surface and
at least four sides,
wherein a first one of the sides comprises a first connection profile and a second one of the sides comprises a second connection profile, the first and second connection profiles being arranged on opposed sides of the panel, the first connection profile being configured for mechanically engaging and interlocking with a second connection profile of another flooring panel,
wherein the first side and the top surface meet at a top edge of the first side and the second side and the top surface meet at a top edge of the second side,
wherein the first connection profile comprises a tongue protruding beyond the top edge of the first side,
wherein the second connection profile comprises a groove recessed with respect to the top edge of the second side, the groove being delimited at a bottom of the groove by a base, protruding or not beyond the top edge of the second side;
wherein the flooring panel is of a laminar structure, including a rigid core layer having a modulus of elasticity, measured according to EN 310, greater than 1000 MPa, and a wear layer arranged on the core layer;
wherein the core layer includes a first sublayer of a first composite material and a second sublayer of a second composite material;
wherein each of the first and second composite materials comprises thermoplastic material and filler material, the first and second composite materials being of different formulations, the filler material of the first and second composite materials consisting of at least 70% by weight of mineral material;
wherein the base delimiting the bottom of the groove is realized at least to 80% of a weight of the base within the first sublayer of the core layer; and
the first composite material has lower stiffness than the second composite material.

16. The floor or wall covering panel as claimed in claim 1, wherein the base delimiting the bottom of the groove is realized entirely within the first sublayer of the core layer.

17. The floor or wall covering panel as claimed in claim 1, wherein the first and second connection profiles are machined into the first and second sides, respectively.

18. The floor or wall covering panel as claimed in claim 1, wherein the base delimiting the bottom of the groove is realized at least to 90% of a weight of the base within the first sublayer of the core layer.

19. The flooring panel as claimed in claim 15, wherein the first and second sublayers are one of: a) coextruded composite layers and b) extruded separately and then laminated together.

20. The flooring panel as claimed in claim 15, wherein the base delimiting the bottom of the groove is realized at least to 90% of a weight of the base within the first sublayer of the core layer.

21. A wallcovering panel, comprising:
a top surface,
a bottom surface and
at least four sides,
wherein a first one of the sides comprises a first connection profile and a second one of the sides comprises a second connection profile, the first and second connection profiles being arranged on opposed sides of the panel, the first connection profile being configured for mechanically engaging and interlocking with a second connection profile of another wallcovering panel,
wherein the first side and the top surface meet at a top edge of the first side and the second side and the top surface meet at a top edge of the second side,
wherein the first connection profile comprises a tongue protruding beyond the top edge of the first side,
wherein the second connection profile comprises a groove recessed with respect to the top edge of the second side, the groove being delimited at a bottom of the groove by a base, protruding or not beyond the top edge of the second side;
wherein the wallcovering panel is of a laminar structure, including a rigid core layer having a modulus of elasticity, measured according to EN 310, greater than 1000 MPa, and a wear layer arranged on the core layer;
wherein the core layer includes a first sublayer of a first composite material and a second sublayer of a second composite material;
wherein each of the first and second composite materials comprises thermoplastic material and filler material, the first and second composite materials being of different formulations, the filler material of the first and second composite materials consisting of at least 70% by weight of mineral material;

wherein the base delimiting the bottom of the groove is realized at least to 80% of a weight of the base within the first sublayer of the core layer; and the first composite material has lower stiffness than the second composite material.

22. The wallcovering as claimed in claim 21, wherein the first and second sublayers are one of: a) coextruded composite layers and b) extruded separately and then laminated together.

23. The wallcovering panel as claimed in claim 21, wherein the base delimiting the bottom of the groove is realized at least to 90% of its weight within the first sublayer of the core layer.

* * * * *